United States Patent
Sekiguchi et al.

(10) Patent No.: US 10,618,575 B2
(45) Date of Patent: Apr. 14, 2020

(54) WALL SURFACE SUCTION TRAVELING DEVICE

(71) Applicant: Panasonic Intellectual Property Management Co., Ltd., Osaka (JP)

(72) Inventors: Tomohiro Sekiguchi, Kanagawa (JP); Yoshinari Matsuyama, Osaka (JP); Tomomi Nishikata, Ishikawa (JP); Masaki Shikanai, Kanagawa (JP); Takeshi Kikuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/504,407

(22) Filed: Jul. 8, 2019

(65) Prior Publication Data
US 2019/0329830 A1 Oct. 31, 2019

Related U.S. Application Data

(63) Continuation of application No. PCT/JP2017/043555, filed on Dec. 5, 2017.

(30) Foreign Application Priority Data

Jan. 13, 2017 (JP) .................................. 2017-003883

(51) Int. Cl.
*B62D 55/075* (2006.01)
*B60D 1/155* (2006.01)
(Continued)

(52) U.S. Cl.
CPC .......... *B62D 55/075* (2013.01); *B60D 1/155* (2013.01); *B60D 3/00* (2013.01); *B62D 53/00* (2013.01); *B62D 55/065* (2013.01)

(58) Field of Classification Search
CPC .... B62D 55/075; B62D 55/065; B62D 53/00; B62D 57/024; B60D 3/00; B60D 1/155
See application file for complete search history.

(56) References Cited

U.S. PATENT DOCUMENTS

| 4,095,378 A | * | 6/1978 | Urakami | B24C 3/062 114/222 |
| 4,809,383 A | * | 3/1989 | Urakami | B08B 1/04 114/222 |

(Continued)

FOREIGN PATENT DOCUMENTS

JP 02-095989 4/1990

OTHER PUBLICATIONS

International Search Report dated Jan. 23, 2018 in International (PCT) Application No. PCT/JP2017/043555 with English translation.

*Primary Examiner* — Joseph M Rocca
*Assistant Examiner* — Michael R Stabley
(74) *Attorney, Agent, or Firm* — Wenderoth, Lind & Ponack, L.L.P.

(57) ABSTRACT

A wall surface suction travel device includes a first travel unit, a second travel unit, a joint mechanism, and an elastic mechanism. The travel units are aligned along a travel direction and are each configured to travel on a wall surface while being suctioned on the wall surface. The joint mechanism couples the travel units together such that the travel units can pivot relative to each other on a pivot axis extending in a direction that is perpendicular to both a wall surface facing direction and the travel direction. The elastic mechanism includes a first end fixed to the first travel unit, a second end fixed to the second travel unit, and an elastic member configured to be elastically deformed when one of the travel units pivots relative to the other travel unit and a (Continued)

distance between the first end and the second end is shortened.

7 Claims, 11 Drawing Sheets

(51) Int. Cl.
  *B60D 3/00* (2006.01)
  *B62D 53/00* (2006.01)
  *B62D 55/065* (2006.01)

(56) References Cited

U.S. PATENT DOCUMENTS

| | | | |
|---|---|---|---|
| 5,592,998 A * | 1/1997 | Urakami | B62D 57/00 180/164 |
| 6,102,145 A * | 8/2000 | Fisher | B08B 3/024 180/164 |
| 6,484,083 B1 | 11/2002 | Hayward et al. | |
| 6,523,629 B1 | 2/2003 | Buttz et al. | |
| 6,870,343 B2 * | 3/2005 | Borenstein | B08B 9/045 180/9.21 |
| 6,880,651 B2 * | 4/2005 | Loh | B62D 12/00 180/14.2 |
| 6,964,312 B2 * | 11/2005 | Maggio | B62D 49/0635 15/340.1 |
| 7,400,108 B2 * | 7/2008 | Minor | G05D 1/0293 180/14.1 |
| 7,520,356 B2 * | 4/2009 | Sadegh | B62D 49/0621 180/127 |
| 7,938,216 B2 * | 5/2011 | Urakami | B62D 57/02 180/164 |
| 7,980,916 B2 * | 7/2011 | Clark, Jr. | A63H 17/26 446/454 |
| 8,225,895 B1 * | 7/2012 | Salton | B62D 55/0655 180/167 |
| 8,991,528 B2 * | 3/2015 | Hellholm | B60K 6/46 180/14.2 |
| 9,738,337 B2 * | 8/2017 | Li | B25J 15/06 |
| 2007/0235238 A1 | 10/2007 | Sadegh et al. | |

* cited by examiner

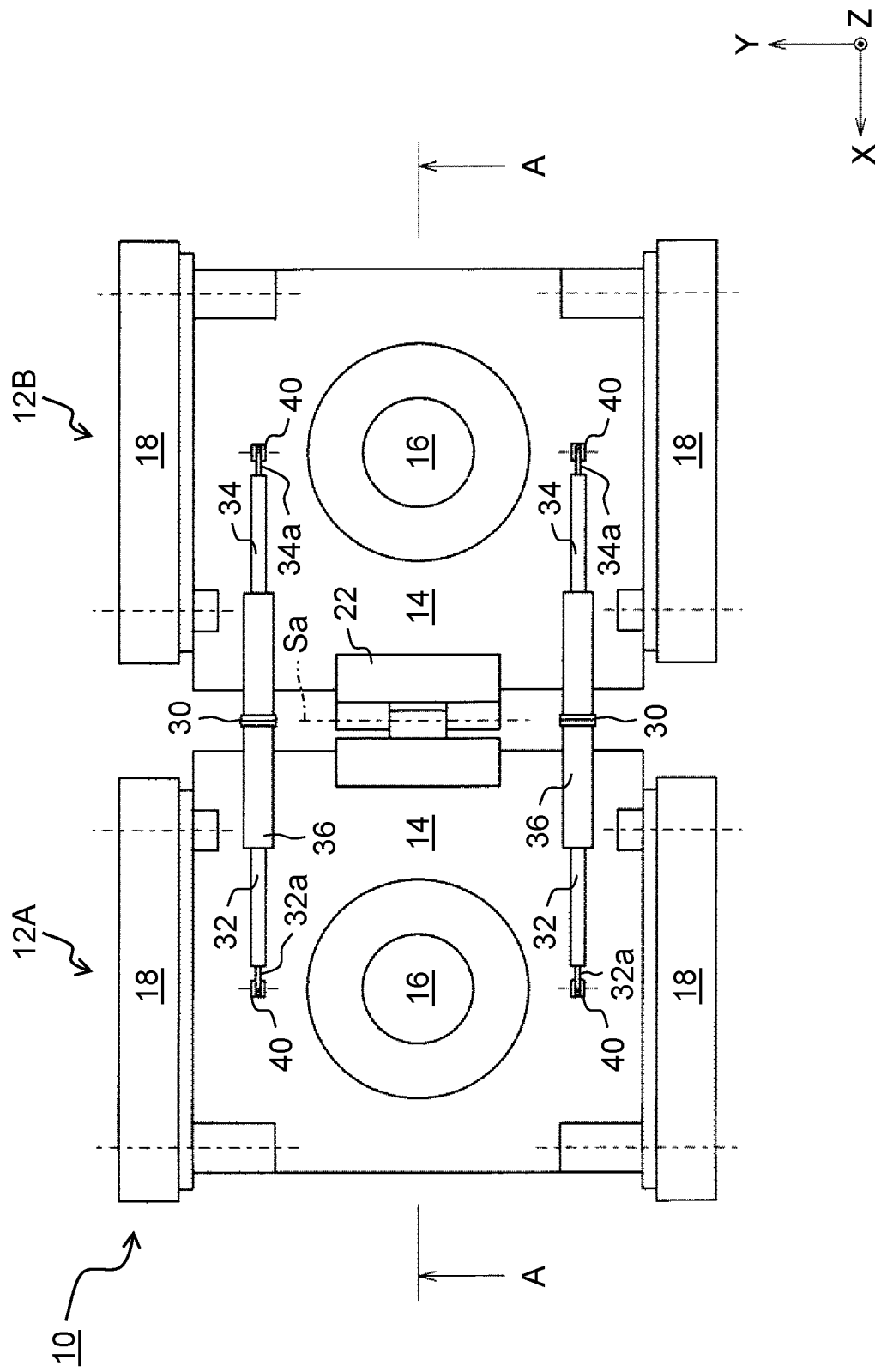

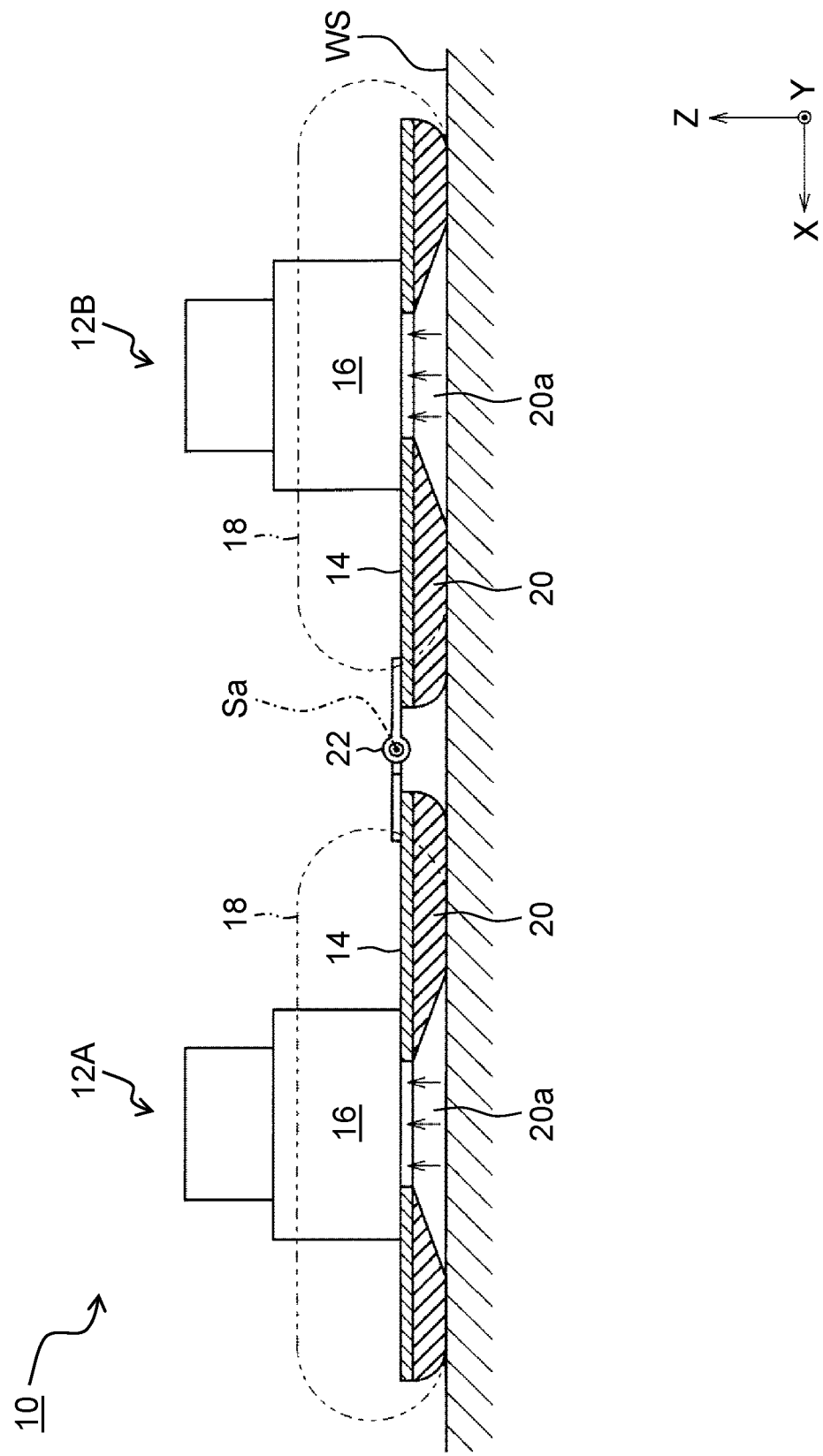

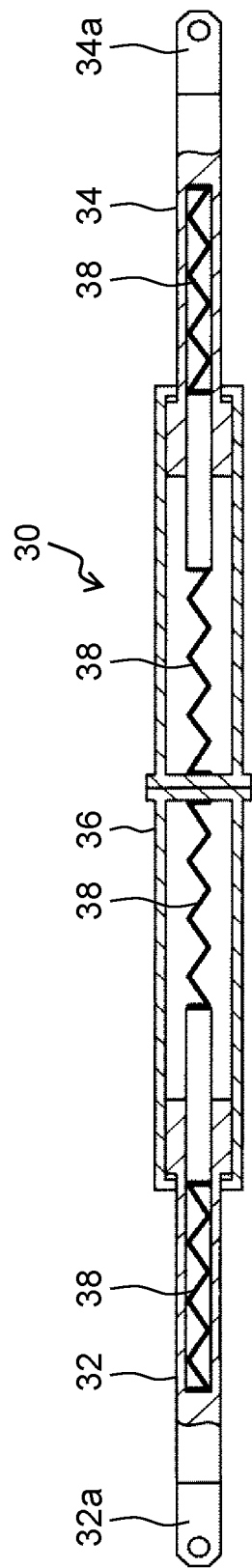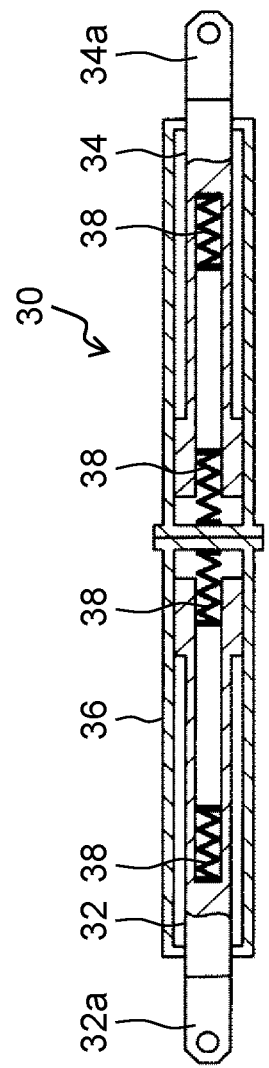
FIG. 4A
FIG. 4B

WALL SURFACE SUCTION TRAVELING DEVICE

TECHNICAL FIELD

The present disclosure relates to a wall surface suction-type travel device capable of traveling on a wall surface while being suctioned on the wall surface.

BACKGROUND ART

It is known that a wall surface suction-type travel device as is described in US 2007/0235238 is, for example, capable of traveling between wall surfaces that intersect each other at right angles. The wall surface suction-type travel device includes two suction modules having respective wheels and being designed to be suctioned onto a wall surface. The two suction modules are coupled to each other via a hinge in a direction along which the suction-type travel device travels. This configuration allows one of the suction modules to pivot relative to the other suction module on a pivot axis extending in a direction perpendicular both to a direction in which the suction-type travel device faces the wall surface and the travel direction. An angle at which the modules pivot relative to each other is controlled by a hinge motor.

Unfortunately, the wall surface suction-type travel device described in US 2007/0235238 requires using the hinge motor and a controller to control the hinge motor. A transfer of the suction-type travel device from a wall surface to an overhung surface such as a ceiling surface, for example, necessitates controlling the hinge motor with high accuracy such that the proceeding suction module comes into contact with the overhang surface while maintaining a proper posture. Consequently, the suction-type travel device needs to have a complex configuration in order to reliably transfer from a wall surface to an overhung surface such as a ceiling surface.

SUMMARY

The present disclosure provides a wall surface suction-type travel device having a simpler configuration and being capable of transferring, for example, from a wall surface to an overhung surface such as a ceiling surface with improved reliability.

A wall surface suction-type travel device according to an aspect of the present disclosure, accomplished to solve the challenge described above, includes a first travel unit, a second travel unit, a joint mechanism, and an elastic mechanism. The first and the second travel units are aligned along a travel direction in which the suction-type travel device travels and are each configured to travel on a wall surface while being suctioned on the wall surface. The joint mechanism couples the first and the second travel units together such that the first and the second travel units can pivot relative to each other on a pivot axis extending in a direction that is perpendicular both to a direction in which the suction-type travel device faces the wall surface and the travel direction. The elastic mechanism includes a first end fixed to the first travel unit, a second end fixed to the second travel unit, and an elastic member configured to be elastically deformed when one of the first and the second travel units pivots relative to the other travel unit and a distance between the first end and the second end is shortened.

According to the present disclosure, the wall surface suction-type travel device has a simpler configuration and is capable of transferring, for example, from a wall surface to an overhung surface such as a ceiling surface with improved reliability.

BRIEF DESCRIPTION OF DRAWINGS

FIG. 2 is a top view of the wall surface suction-type travel device.

FIG. 3 is a cross-sectional view taken along line A-A of FIG. 2.

FIG. 4A is a cross-sectional view of an elastic mechanism that is expanded.

FIG. 4B is a cross-sectional view of the elastic mechanism that is contracted.

DESCRIPTION OF EMBODIMENTS

Figure 1:
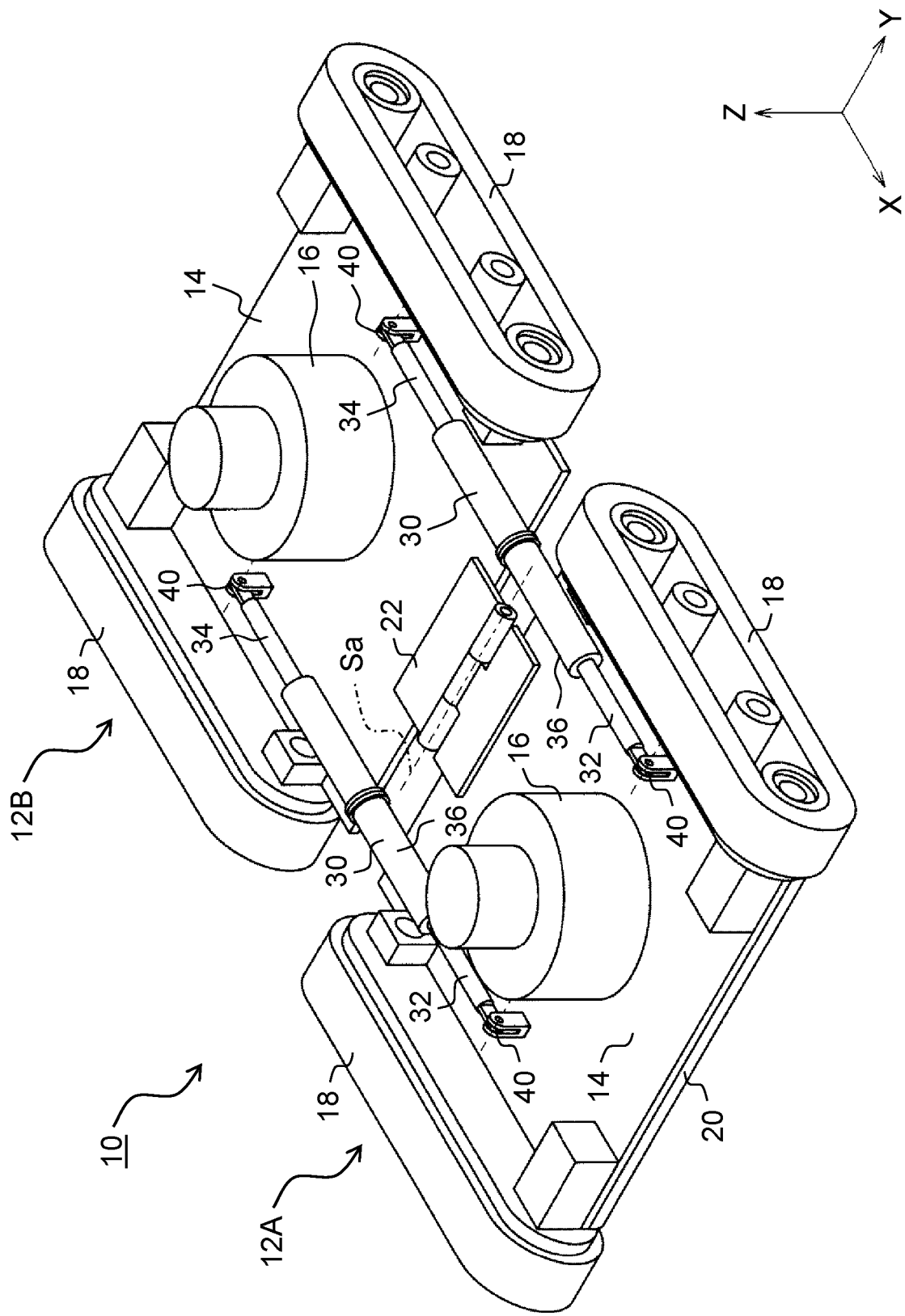
FIG. 1 is a perspective view of a wall surface suction-type travel device according to an exemplary embodiment of the present disclosure.

A wall surface suction-type travel device according to an aspect of the present disclosure includes a first travel unit, a second travel unit, a joint mechanism, and an elastic mechanism. The first and the second travel units are aligned along a direction in which the suction-type travel device travels and are each capable of traveling on a wall surface while being suctioned on the wall surface. The joint mechanism couples the first and the second travel units together such that the travel units can pivot relative to each other on a pivot axis extending in a direction that is perpendicular both to a direction in which the suction-type travel device faces the wall surface and the travel direction. The elastic mechanism includes a first end fixed to the first travel unit, a second end fixed to the second travel unit, and an elastic member configured to be elastically deformed when one of the first and the second travel units pivots relative to the other travel unit and a distance between the first end and the second end is shortened.

Accordingly, the wall surface suction-type travel device has a simpler configuration and is capable of transferring, for example, from a wall surface to an overhung surface such as a ceiling surface with improved reliability.

The elastic mechanism, for example, includes a first rod having the first end, a second rod having the second end, and a holder holding the first and the second rods such that these rods are slidable on an identical straight line. The elastic member is, for example, disposed between the first and the second rods. For example, the first end is fixed to the first travel unit such that the first rod is allowed to pivot, whereas the second end is fixed to the second travel unit such that the second rod is allowed to pivot.

The joint mechanism is, for example, formed of a universal joint.

The first travel unit and the second travel unit, for example, have respective crawlers to roll on a wall surface.

The first travel unit and the second travel unit, for example, have respective suction devices to get the individual travel units to be suctioned on a wall surface.

While a preceding travel unit that is one of the first and the second travel units is transferring from a wall surface to another wall surface (e.g. an overhung surface), the preceding travel unit travels while being not suctioned owing to a suspension of suction and a succeeding travel unit that is the other of the first and the second travel units travels while being suctioned, for example. Hence, the preceding travel unit stops being suctioned and is thereby able to readily leave the wall surface. This enables the preceding travel unit to smoothly transfer from the wall surface to the overhung surface.

Exemplary embodiments will be described in detail below with reference to the drawings as appropriate. However, detailed description more than necessary may be omitted. For example, detailed description of well-known matters and redundant description of structures that are substantially the same may be omitted. This is to avoid unnecessary redundancy in the following description and to facilitate understanding by those skilled in the art.

Note that the inventors provide the accompanying drawings and the description below to help those skilled in the art to fully understand the present disclosure, and do not intend to use the accompanying drawings or the description below to limit the subject matter described in the claims.

FIG. 1 is a schematic perspective view of a wall surface suction-type travel device according to an exemplary embodiment of the present disclosure. FIG. 2 is a top view of the wall surface suction-type travel device. FIG. 3 is a cross-sectional view taken along line A-A of FIG. 2. An X-Y-Z orthogonal coordinate system illustrated in the drawings is provided to help understanding of the present disclosure and is not intended to limit the present disclosure.

Wall surface suction-type travel device 10 shown in FIGS. 1 and 2 is a device capable of traveling on a wall surface while being suctioned on the wall surface. Surfaces on which the device is capable of traveling are not limited to wall surfaces. Wall surface suction-type travel device 10 is capable of traveling on an overhung surface such as a ceiling surface, as well as a floor surface.

As shown in FIGS. 1 and 2, wall surface suction-type travel device 10 has first travel unit 12A and second travel unit 12B that are aligned along a travel direction (an X-axis direction).

In wall surface suction-type travel device 10, first and second travel units 12A and 12B have a substantially identical structure. Thus, a configuration of first travel unit 12A will be described and a description of a configuration of second travel unit 12B will be omitted.

First travel unit 12A of wall surface suction-type travel device 10 includes main body 14, suction device 16 mounted on main body 14, and crawlers 18 disposed on both sides of main body 14 in a width direction (a Y-axis direction).

Suction device 16 of first travel unit 12A is provided to get main body 14 to be suctioned on a surface such as a wall surface or a ceiling surface. Specifically, as shown in FIG. 3, a part of main body 14 facing wall surface WS is equipped with cushion 20 that slides on wall surface WS while the first travel unit is suctioned to travel. In cushion 20, recessed negative-pressure room 20a is formed.

As shown in FIG. 3, cushion 20 is made from an elastic material, for example, and is designed to adhere closely to wall surface WS. Cushion 20 adheres closely to wall surface WS and thereby negative-pressure room 20a is closed. Suction device 16 sucks in air from closed negative-pressure room 20a. As a result, first travel unit 12A is suctioned on wall surface WS.

Suction device 16 includes a suction pump to suck in air from negative-pressure room 20a and a fan to forcibly evacuate air from negative-pressure room 20a.

Each crawler 18 of first travel unit 12A is a caterpillar made from a material (e.g., an elastic material) that generates friction against wall surface WS. Crawlers 18 roll on wall surface WS while main body 14 is suctioned on wall surface WS and thereby first travel unit 12A travels on wall surface WS.

As described above, first and second travel units 12A and 12B have a substantially identical structure. In other words, each travel unit is able to travel on wall surface WS by itself.

As shown in FIGS. 1 and 2, first and second travel units 12A and 12B having the substantially identical structure are aligned along the travel direction (the X-axis direction) and are coupled to each other.

Specifically, first and second travel units 12A and 12B are coupled to each other through joint mechanism 22 in the travel direction (the X-axis direction). In this exemplary embodiment, joint mechanism 22 is a hinge that couples first and second travel units 12A and 12B together such that the travel units can freely pivot on pivot axis Sa relative to each other. Pivot axis Sa is an axis extending in a direction (the Y-axis direction) that is perpendicular both to the travel direction (the X-axis direction) and a direction (a Z-axis direction) along which the suction-type travel device faces the wall surface. This configuration enables first travel unit 12A to pivot on pivot axis Sa relative to second travel unit 12B. Hence, wall surface suction-type travel device 10 is able to travel from a wall surface to a ceiling surface, for example.

First and second travel units 12A and 12B are coupled to each other through elastic mechanism 30 in addition to joint mechanism 22. A function of elastic mechanism 30 will be described.

For instance, when the suction-type travel device transfers from a wall surface to a ceiling surface, a succeeding travel unit, one of first and second travel units 12A and 12B, needs to support a preceding travel unit, the other of the first and second travel units, until the preceding travel unit is completely suctioned on the ceiling surface from the instant at which the preceding travel unit leaves the wall surface. In other words, the succeeding travel unit needs to keep pressing the preceding travel unit against the ceiling surface. Wall surface suction-type travel device 10 has elastic mechanism 30 to enable the succeeding travel unit to keep pressing the preceding travel unit against the ceiling surface.

FIGS. 4A and 4B are cross-sectional views of elastic mechanism 30. FIG. 4A shows elastic mechanism 30 that is most expanded (in natural length), whereas FIG. 4B shows elastic mechanism 30 that is most contracted. In other words, FIG. 4A shows elastic mechanism 30 that is in longest overall length and FIG. 4B shows elastic mechanism 30 that is in shortest overall length.

In this exemplary embodiment, as shown in FIGS. 4A and 4B, elastic mechanism 30 is designed to elastically expand or contract in a direction of extension of the elastic mechanism. Thus, elastic mechanism 30 includes first rod 32, second rod 34, holder 36, and elastic member 38 such as a spring. Holder 36 holds first and second rods 32 and 34 such that these rods are slidable on an identical straight line. Elastic member 38 is disposed between first rod 32 and second rod 34.

As shown in FIG. 2, one end 32a (a first end) of first rod 32 is fixed to first travel unit 12A such that the first rod is allowed to pivot. One end 32a is fixed to main body 14 of first travel unit 12A through bracket 40 such that first rod 32 pivots on a pivot axis parallel to pivot axis Sa.

As shown in FIG. 2, one end 34a (a second end) of second rod 34 is fixed to second travel unit 12B such that the second rod is allowed to pivot. One end 34a is fixed to main body 14 of second travel unit 12B through bracket 40 such that second rod 34 pivots on a pivot axis parallel to pivot axis Sa.

Holder 36 is a tubular component used to hold first and second rods 32 and 34 such that these rods are slidable on an identical straight line (a straight line extending in a direction of extension of the rods). As shown in FIGS. 4A and 4B, holder 36 houses the other end portion of first rod 32 and the other end portion of second rod 34.

Elastic member 38 is a spring or another component used to urge first and second rods 32 and 34 so as to separate the rods from each other and is housed in holder 36. In other words, as shown in FIG. 4B, elastic member 38 is elastically deformed when a distance between one end 32a of first rod 32 and one end 34a of second rod 34 is shortened. Then, elastic member 38 urges the rods so as to separate first and second rods 32 and 34 from each other and such that the distance returns to a distance before being shortened (elastic mechanism 30 returns to be in a natural length). In this exemplary embodiment, elastic member 38 is deformed by compression when the distance between one end 32a of first rod 32 and one end 34a of second rod 34 is shortened. Alternatively, elastic mechanism 30 may have elastic member 38 such that elastic member 38 is deformed by tension when the distance between one end 32a of first rod 32 and one end 34a of second rod 34 is shortened.

Preferably, a spring constant, a natural length, a maximum compression amount, and other properties of elastic member 38 are set such that while preceding first travel unit 12A is transferring from wall surface WS to ceiling surface CS (see FIGS. 5A to 5C), i.e., during the contraction of elastic mechanism 30, repulsive force of elastic member 38 resistant to that contraction (pressing force for extension) is less than or equal to force of contracting elastic mechanism 30 caused by thrust of crawlers 18 of first travel unit 12A. Preferably, the spring constant and a compression amount of elastic member 38 while elastic mechanism 30 is most expanded (in natural strength) are set such that while succeeding second travel unit 12B is transferring from wall surface WS to ceiling surface CS (see FIGS. 5C to 5E), i.e., while elastic mechanism 30 is returning from the state of contraction to natural length, force of elastic member 38 pressing for extension is greater than or equal to force needed to lift up second travel unit 12B to ceiling surface CS. In other words, it is preferred that elastic member 38 continue to be clamped between first rod 32 and second rod 34 and be always compressed.

The function of elastic mechanism 30 will be described below by describing operation of wall surface suction-type travel device 10 transferring from a wall surface to a ceiling surface, for example.

FIGS. 5A to 5E show a process in which wall surface suction-type travel device 10 transfers from wall surface WS to ceiling surface CS.

Figure 5A:
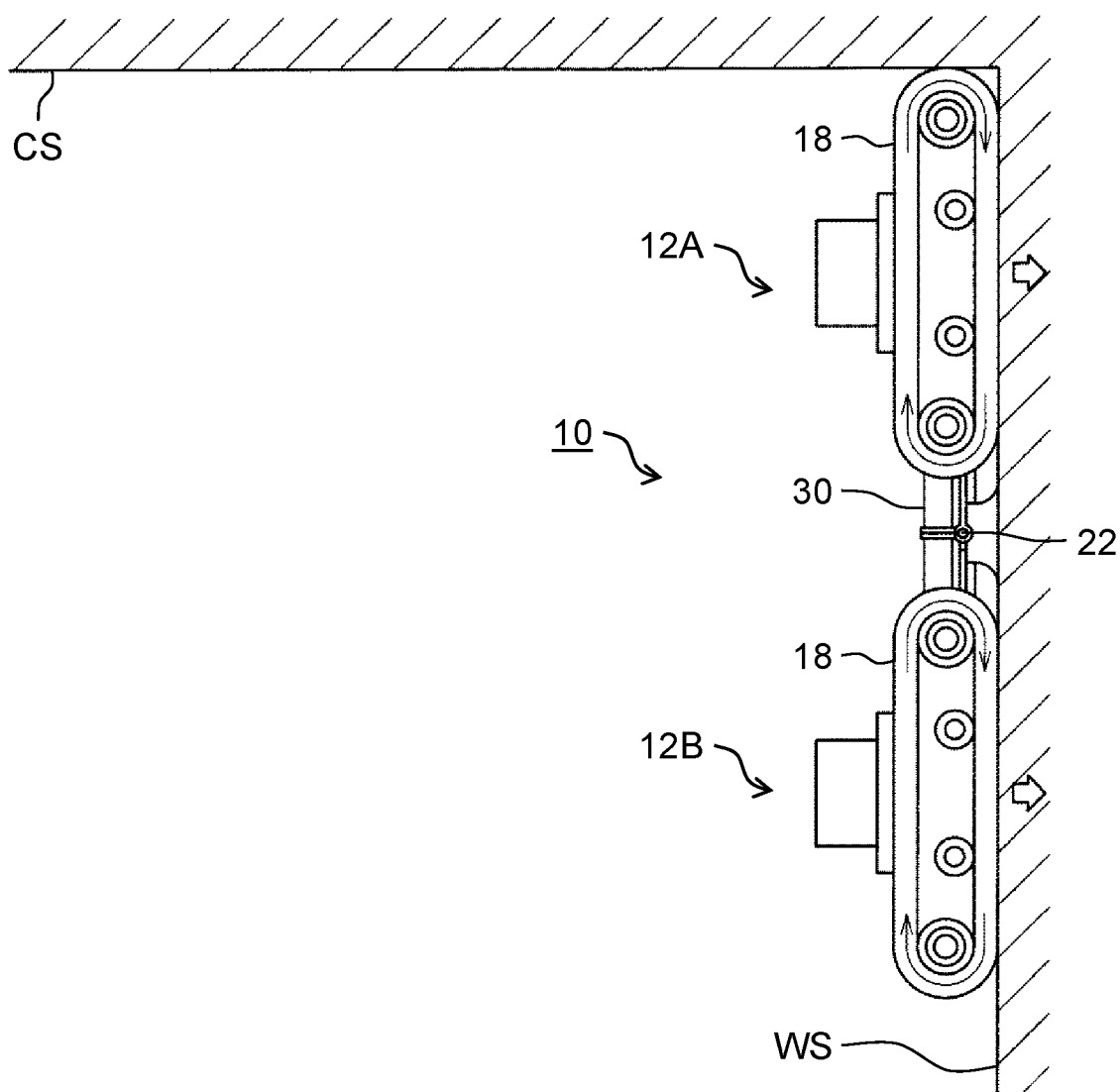
FIG. 5A is a view showing the wall surface suction-type travel device in a process of transferring from a wall surface to a ceiling surface.

As shown in FIG. 5A, while wall surface suction-type travel device 10 is traveling on wall surface WS, first and second travel units 12A and 12B are traveling on wall surface WS while being suctioned on wall surface WS. During this time, elastic mechanism 30 is most expanded (in natural length). Each hollow arrow indicates a state in which the travel unit is suctioned. As shown in FIG. 5A, when crawlers 18 of preceding first travel unit 12A come into contact with ceiling surface CS, preceding first travel unit 12A starts transferring from wall surface WS to ceiling surface CS.

Contact between crawlers 18 of first travel unit 12A and ceiling surface CS can be detected using a sensor such as a contact sensor for detecting contact with ceiling surface CS and a range sensor for measuring a distance to ceiling surface CS. Alternatively, contact between crawlers 18 and ceiling surface CS may be detected by processing images taken with a camera configured to photograph an area forward in the travel direction. In this case, the camera may be mounted on wall surface suction-type travel device 10, or the camera may be installed at a position that is outside wall surface suction-type travel device 10 and that allows taking of images of wall surface suction-type travel device 10 and ceiling surface CS. Thus, in the exemplary embodiment of the present disclosure, contact between a destination surface to which a preceding travel unit is transferring and the preceding travel unit can be detected by any method.

Figure 5B:
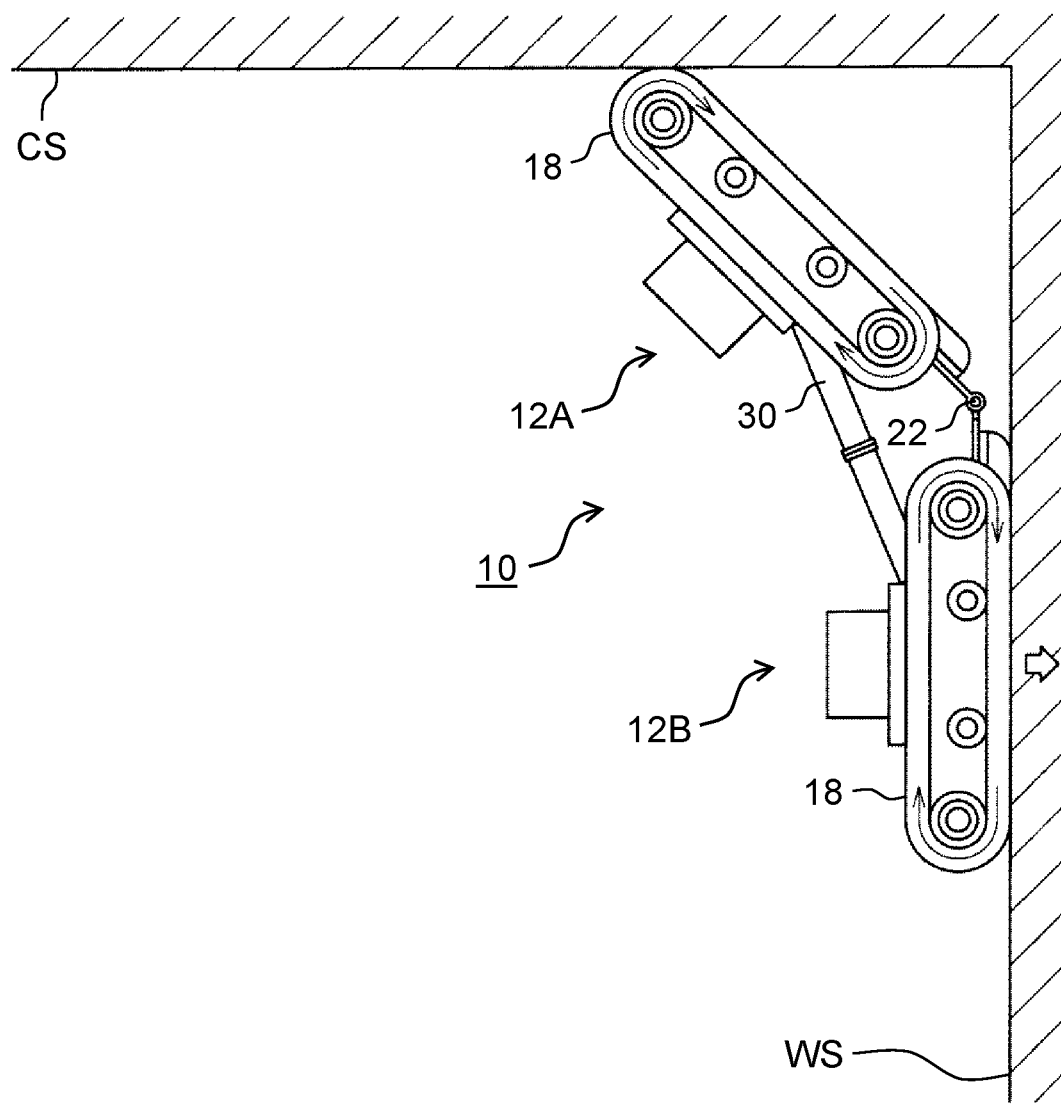
FIG. 5B is a view following FIG. 5A and showing the wall surface suction-type travel device in the process of transferring from the wall surface to the ceiling surface.

As shown in FIG. 5A, when crawlers 18 of first travel unit 12A come into contact with ceiling surface CS, first travel unit 12A discontinues being suctioned on wall surface WS. In other words, suction device 16 of first travel unit 12A suspends suction. First travel unit 12A stops being suctioned and is thereby able to readily leave wall surface WS. However, crawlers 18 of first travel unit 12A keep rotating. This, as shown in FIG. 5B, allows front ends of crawlers 18 of first travel unit 12A to roll on ceiling surface CS. Consequently, first travel unit 12A leaves wall surface WS. As shown in FIG. 2, crawlers 18 extend off main body 14 forward (rearward) in the travel direction to ensure that the front ends of crawlers 18 are the first to come into contact with ceiling surface CS.

Meanwhile, succeeding second travel unit 12B keeps traveling on wall surface WS toward ceiling surface CS while being suctioned on wall surface WS. In other words, second travel unit 12B keeps pressing a rear (a rear portion in the travel direction) of preceding first travel unit 12A via joint mechanism 22. Second travel unit 12B also supports first travel unit 12A via elastic mechanism 30 to ensure that first travel unit 12A does not leave ceiling surface CS by pivoting on pivot axis Sa of joint mechanism 22. In other words, second travel unit 12B keeps maintaining contact between crawlers 18 of first travel unit 12A and ceiling surface CS.

During this time, elastic member 38 of elastic mechanism 30 keeps urging first travel unit 12A toward ceiling surface CS. Hence, grip force is generated between crawlers 18 of first travel unit 12A and ceiling surface CS. This configuration enables crawlers 18 of first travel unit 12A to roll on ceiling surface CS without slipping.

Figure 5C:
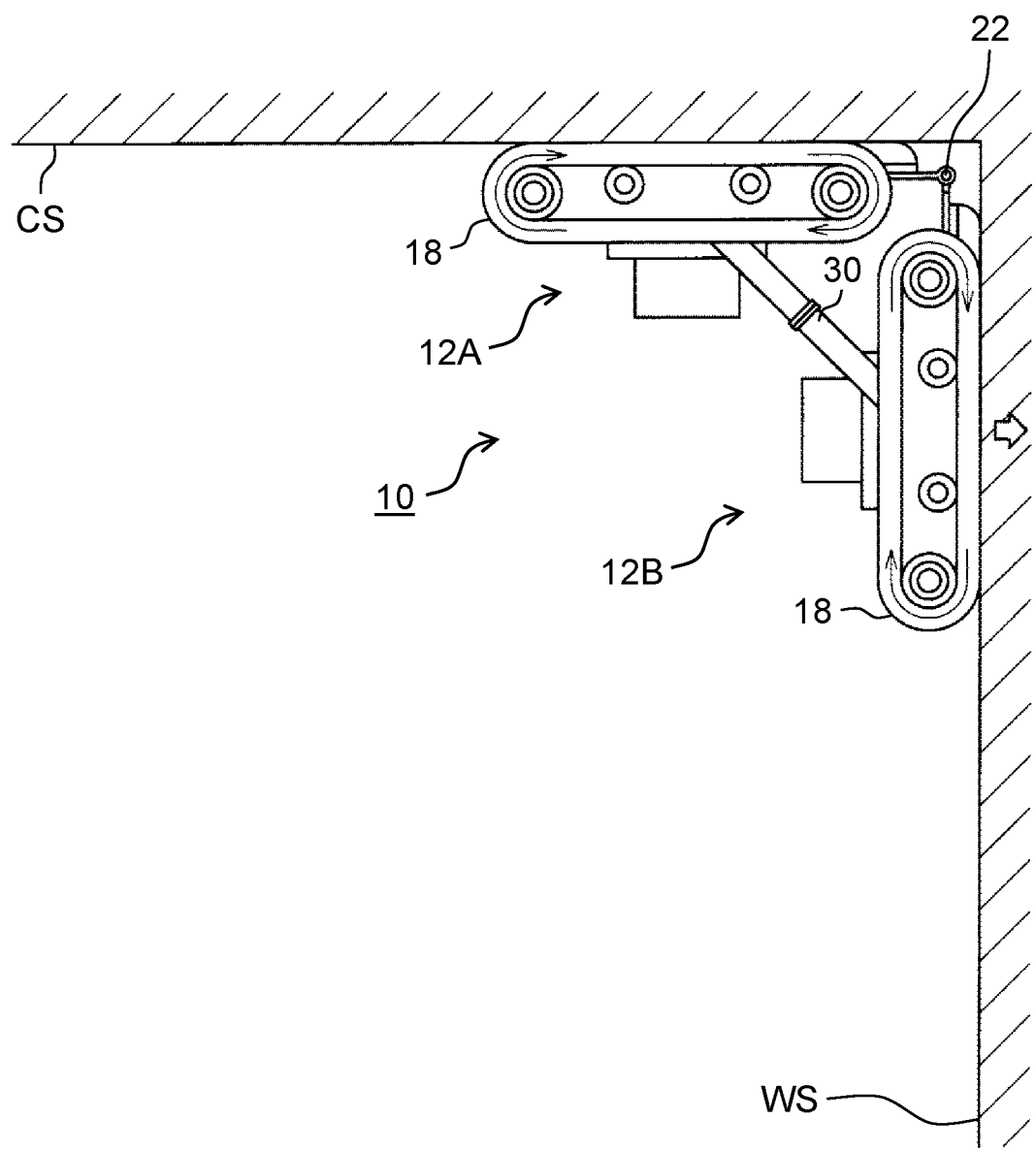
FIG. 5C is a view following FIG. 5B and showing the wall surface suction-type travel device in the process of transferring from the wall surface to the ceiling surface.

Succeeding second travel unit 12B further travels on wall surface WS while being suctioned on wall surface WS and then, as shown in FIG. 5C, crawlers 18 of preceding first travel unit 12A fully come into contact with ceiling surface CS. At this same time, elastic mechanism 30 is most contracted. After this contact, first travel unit 12A starts being suctioned on ceiling surface CS. In other words, suction device 16 of first travel unit 12A restarts suction.

Full contact between crawlers 18 of first travel unit 12A and ceiling surface CS (i.e., completion of the preceding travel unit's transfer) can be detected using a sensor such as a contact sensor for detecting contact with ceiling surface CS and a range sensor for measuring a distance to ceiling surface CS. Alternatively, contact between crawlers 18 and ceiling surface CS may be detected by processing images taken with a camera. In this case, the camera may be mounted on wall surface suction-type travel device 10, or the camera may be installed at a position that is outside wall surface suction-type travel device 10 and that allows taking of images of wall surface suction-type travel device 10 and ceiling surface CS. Whether first travel unit 12A has been completely suctioned on ceiling surface CS can be, for example, detected with a pressure sensor designed to detect pressure inside negative-pressure room 20a. Thus, in the exemplary embodiment of the present disclosure, completion of the preceding travel unit's transfer and completion of subsequent suction can be detected by any methods.

When preceding first travel unit 12A has been completely suctioned on ceiling surface CS, succeeding second travel unit 12B discontinues being suctioned on wall surface WS. In other words, suction device 16 of second travel unit 12B suspends suction. However, crawlers 18 of second travel unit 12B keep rotating.

Figure 5D:
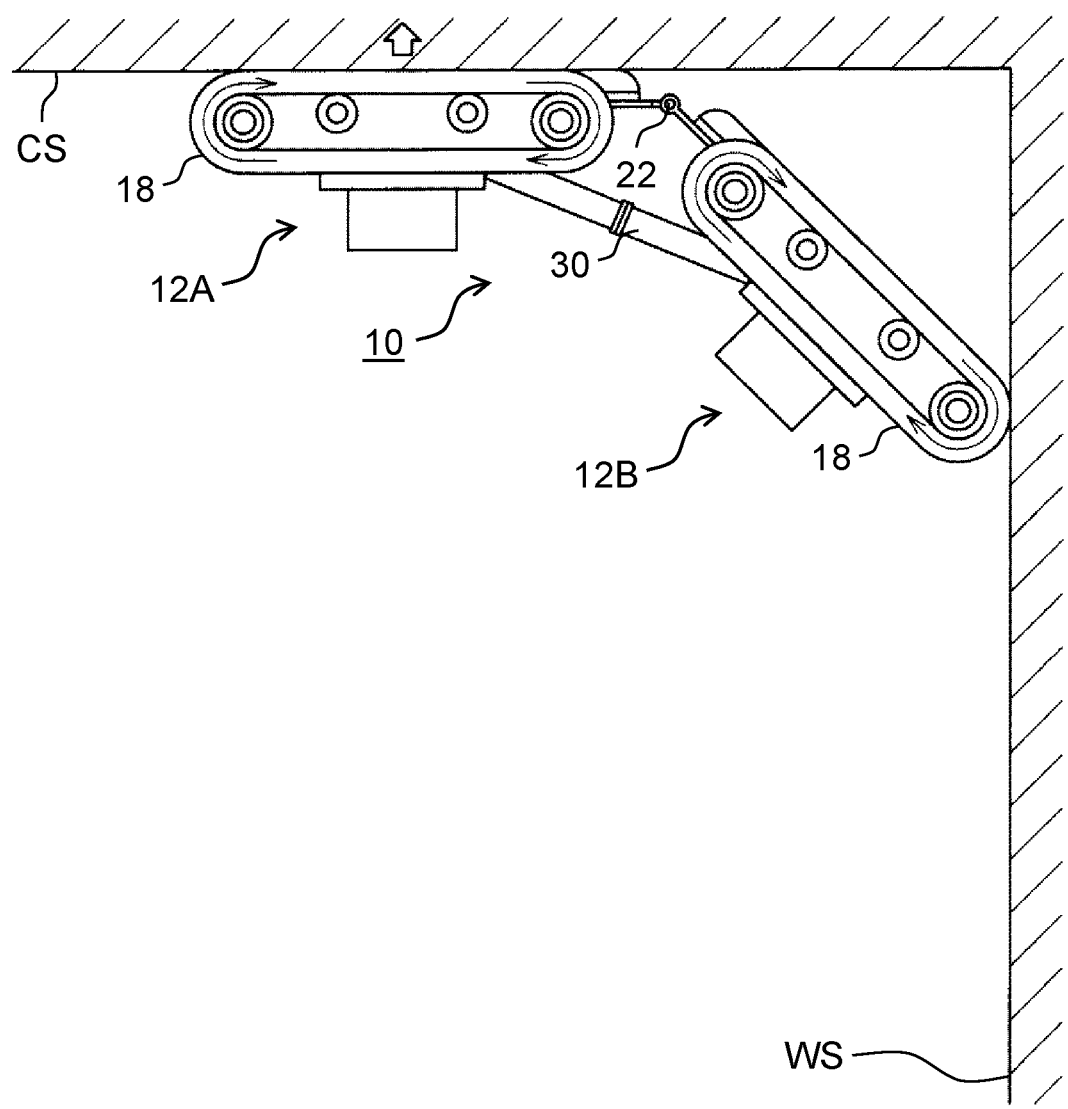
FIG. 5D is a view following FIG. 5C and showing the wall surface suction-type travel device in the process of transferring from the wall surface to the ceiling surface.

Meanwhile, preceding first travel unit 12A travels on ceiling surface CS while being suctioned on ceiling surface CS. This, as shown in FIG. 5D, allows a front (a front portion in the travel direction) of succeeding second travel unit 12B to leave wall surface WS.

First travel unit 12A also supports second travel unit 12B via elastic mechanism 30 to ensure that whole second travel unit 12B pivots on pivot axis Sa of joint mechanism 22 and crawlers 18 of second travel unit 12B do not leave wall surface WS. In other words, first travel unit 12A keeps maintaining contact between crawlers 18 of second travel unit 12B and wall surface WS via elastic mechanism 30.

During this time, elastic member 38 of elastic mechanism 30 keeps urging second travel unit 12B toward wall surface WS. Hence, grip force is generated between crawlers 18 of second travel unit 12B and wall surface WS. This configuration enables crawlers 18 of second travel unit 12B to roll on wall surface WS without slipping.

Figure 5E:
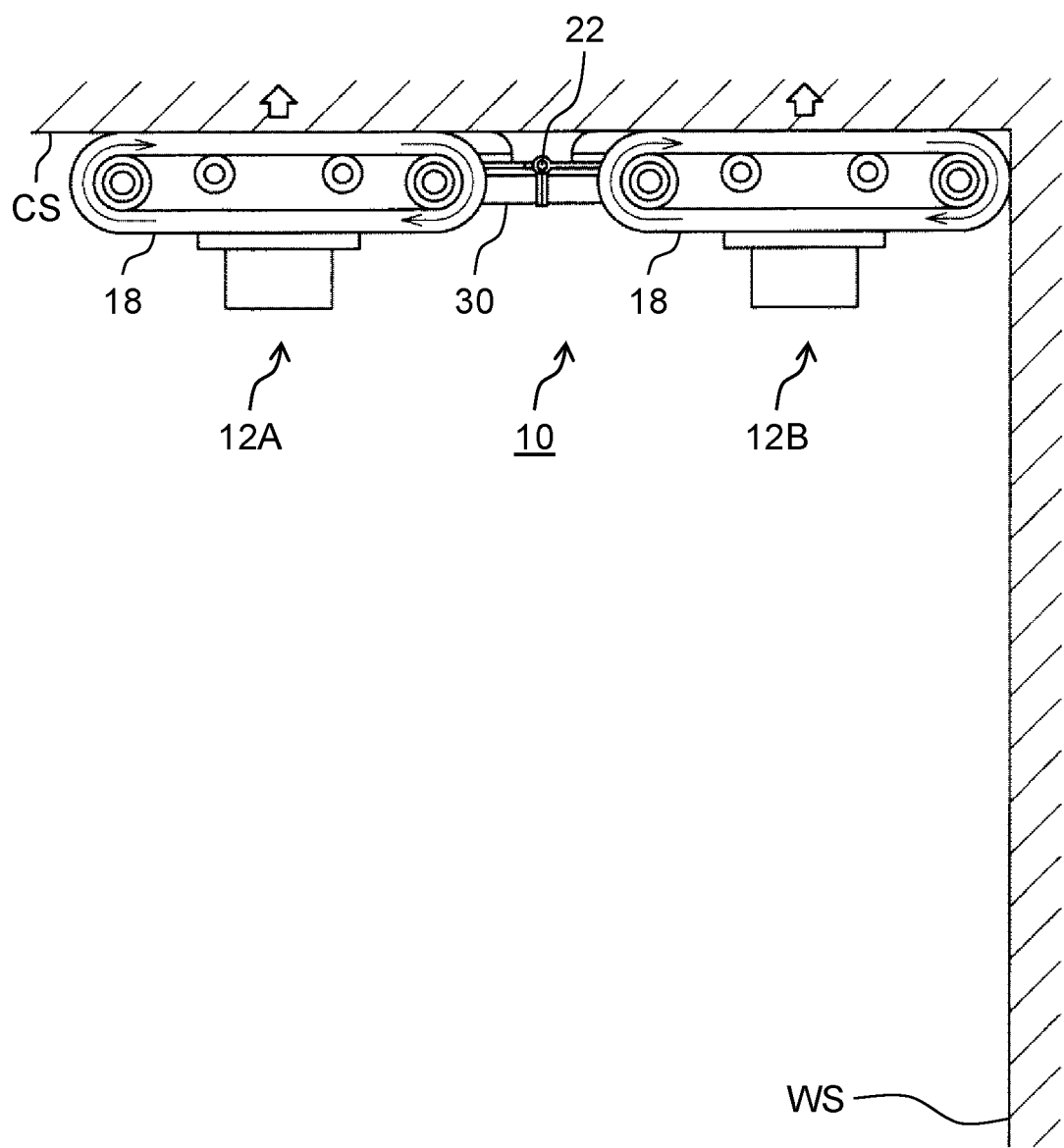
FIG. 5E is a view following FIG. 5D and showing the wall surface suction-type travel device in the process of transferring from the wall surface to the ceiling surface.

Preceding first travel unit 12A further travels on ceiling surface CS while being suctioned on ceiling surface CS and then, as shown in FIG. 5E, crawlers 18 of second travel unit 12B fully come into contact with ceiling surface CS. Afterward, second travel unit 12B restarts being suctioned on ceiling surface CS. In other words, suction device 16 of second travel unit 12B restarts suction.

Elastic member 38 of elastic mechanism 30 urges second travel unit 12B toward wall surface WS from the instant at which crawlers 18 of second travel unit 12B fully come into contact with ceiling surface CS until second travel unit 12B is completely suctioned on the ceiling surface. In other words, second travel unit 12B is clamped between first travel unit 12A and wall surface WS.

Full contact between crawlers 18 of second travel unit 12B and ceiling surface CS (i.e., completion of the succeeding travel unit's transfer) can be detected using a sensor such as a contact sensor for detecting contact with ceiling surface CS and a range sensor for measuring a distance to ceiling surface CS. Alternatively, contact between crawlers 18 and ceiling surface CS may be detected by processing images taken with a camera. In this case, the camera may be mounted on wall surface suction-type travel device 10, or the camera may be installed at a position that is outside wall surface suction-type travel device 10 and that allows taking of images of wall surface suction-type travel device 10 and ceiling surface CS. Whether second travel unit 12B has been completely suctioned on ceiling surface CS can be, for example, detected with a pressure sensor designed to detect pressure inside negative-pressure room 20a. Thus, in the exemplary embodiment of the present disclosure, completion of the succeeding travel unit's transfer and completion of subsequent suction can be detected by any methods.

When second travel unit 12B is completely suctioned on ceiling surface CS, wall surface suction-type travel device 10 has completely transferred from wall surface WS to ceiling surface CS.

The transfer from wall surface WS to ceiling surface CS has been described in this example. In a similar manner, the wall surface suction-type travel device transfers from ceiling surface CS to wall surface WS, from a floor surface to a wall surface, and from a wall surface to another wall surface, for example. The surfaces between which the suction-type travel device travels in FIGS. 5A to 5E are at right angles and this is, however, not essential. The suction-type travel device travels between surfaces as long as an angle formed by these surfaces is less than 180 degrees.

According to the present exemplary embodiment described above, wall surface suction-type travel device 10 does not require a motor and complicated control for the motor. The wall surface suction-type travel device includes elastic member 38 in a simple configuration and is capable of transferring, for example, from a wall surface to an overhung surface such as a ceiling surface with improved reliability.

Exemplary embodiments of the present disclosure are not limited to the exemplary embodiment described above.

For instance, elastic mechanism 30 may have a damping function to reduce vibrations during expansion or contraction. In other words, elastic mechanism 30 may have a damper.

In the exemplary embodiment described above, as shown in FIG. 1, first and second travel units 12A and 12B of wall surface suction-type travel device 10 have crawlers 18 as means for traveling on the wall surface, i.e., a rolling part for rolling on the wall surface. However, exemplary embodiments of the present disclosure are not limited to this example. For instance, the rolling parts of wall surface suction-type travel device 10 used to travel and roll on the wall surface may be rollers, wheels, or something similar.

In the exemplary embodiment described above, first and second travel units 12A and 12B of wall surface suction-type travel device 10 are stuck on the wall surface or the ceiling surface by suction. However, exemplary embodiments of the present disclosure are not limited to this example. For instance, first and second travel units may be stuck on the wall surface or the ceiling surface by electrostatic attraction.

In the exemplary embodiment described above, first and second travel units 12A and 12B have a substantially identical structure. However, exemplary embodiments of the present disclosure are not limited to this example.

Further, in the exemplary embodiment described above, as shown in FIG. 2, one end 32a of each first rod 32 of elastic mechanism 30 is between a pair of crawlers 18 and is fixed to main body 14 of first travel unit 12A. One end 34a of each second rod 34 of elastic mechanism 30 is between a pair of crawlers 18 and is fixed to main body 14 of second travel unit 12B. However, exemplary embodiments of the present disclosure are not limited to this example.

Figure 6:
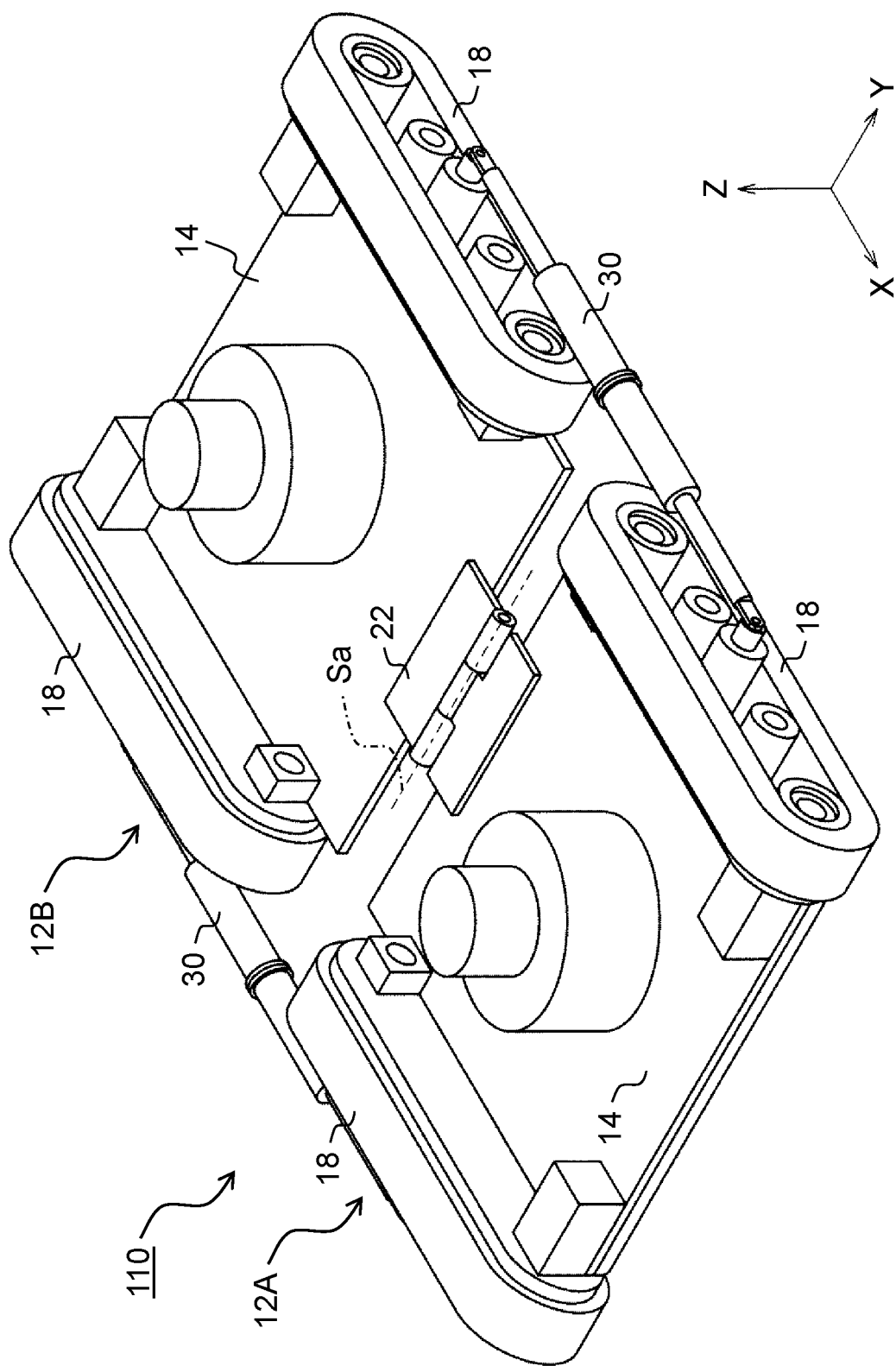
FIG. 6 is a perspective view of a wall surface suction-type travel device according to another exemplary embodiment of the present disclosure.

FIG. 6 shows a wall surface suction-type travel device according to another exemplary embodiment.

As shown in FIG. 6, in wall surface suction-type travel device 110 according to the other exemplary embodiment, each elastic mechanism 30 is disposed outside pairs of crawlers 18. This mode, in a similar way to wall surface suction-type travel device 10 shown in FIGS. 1 and 2 in the exemplary embodiment, enables wall surface suction-type travel device 110 to transfer, for example, from a wall surface to a ceiling surface.

In the exemplary embodiment described above, as shown in FIG. 1, first and second travel units 12A and 12B are coupled to each other through joint mechanism 22 such that the travel units can pivot relative to each other on pivot axis Sa extending in a direction (the Y-axis direction) that is perpendicular both to the wall surface facing direction (the Z-axis direction) and the travel direction (the X-axis direction). However, exemplary embodiments of the present disclosure are not limited to this example. For instance, the joint mechanism may be formed of a universal joint. In this case, a first end of an elastic mechanism is fixed to a first travel unit via a universal joint, and a second end of the elastic mechanism is fixed to a second travel unit via the universal joint. In other words, the joint mechanism is satisfactory as long as the joint mechanism couples the first travel unit and the second travel unit together such that the travel units each can pivot on at least pivot axis Sa shown in FIG. 1. To put it another way, the joint mechanism may couple the first travel unit and the second travel unit together such that the travel units each can pivot on pivot axis Sa as well as an axis other than pivot axis Sa. This configuration enables the wall surface suction-type travel device to travel on not only a plane but also a curved surface such as a free-form surface while being suctioned on the surface.

Furthermore, in the exemplary embodiment described above, as shown in FIG. 1, joint mechanism 22, which couples first and second travel units 12A and 12B together, has single pivot axis Sa. However, the joint mechanism may have a plurality of pivot axes extending in an identical direction.

Figure 7:
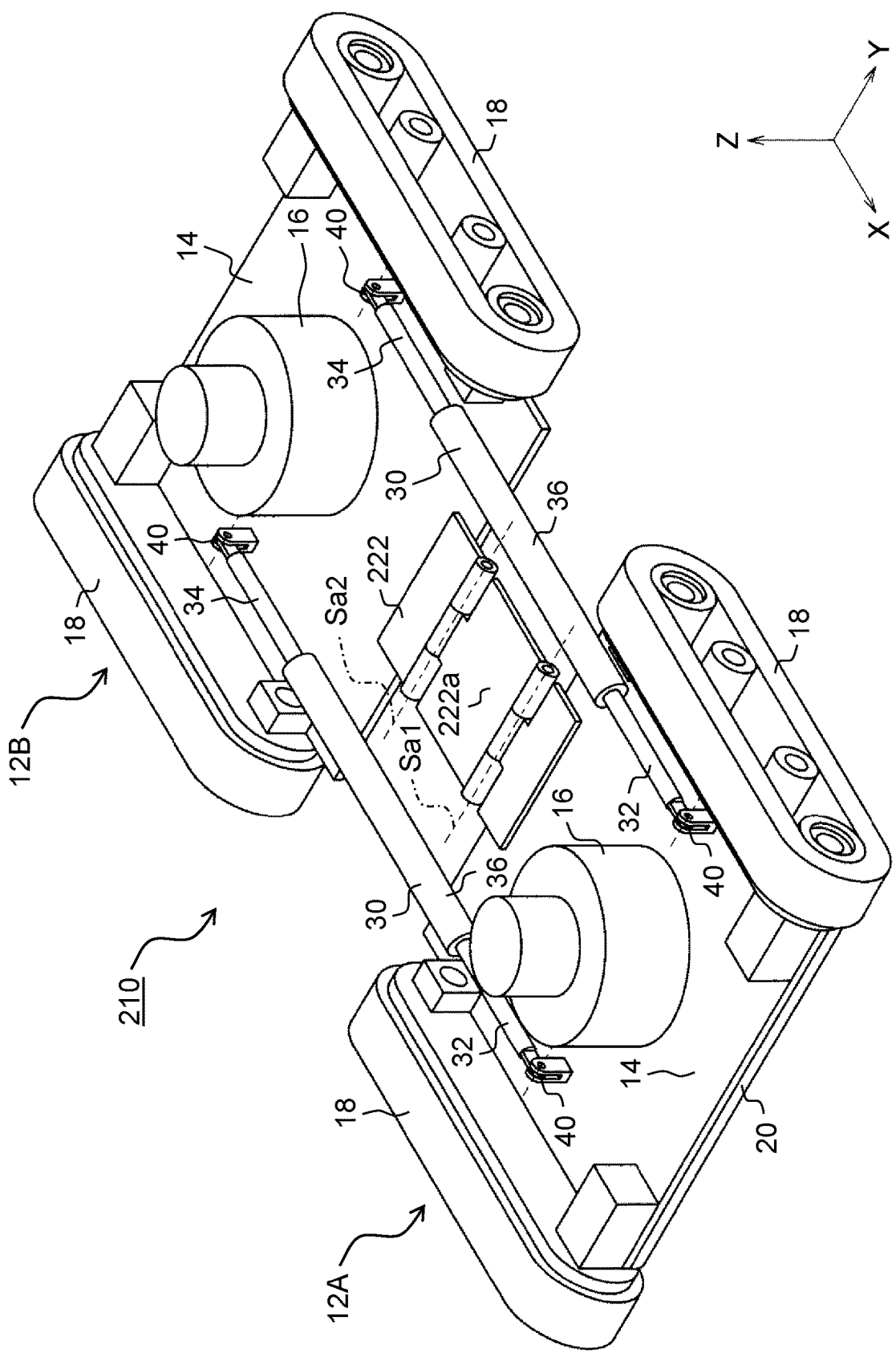
FIG. 7 is a perspective view of a wall surface suction-type travel device according to still another exemplary embodiment of the present disclosure.

FIG. 7 shows a wall surface suction-type travel device according to another exemplary embodiment.

Wall surface suction-type travel device 210 shown in FIG. 7 has joint mechanism 222 that couples first travel unit 12A and second travel unit 12B together. Joint mechanism 222 is what is called a double action hinge that has two pivot axes Sa1, Sa2 extending in an identical direction. Two pivot axes Sa1, Sa2 extend in a direction (the Y-axis direction) perpendicular both to the wall surface facing direction (the Z-axis direction) and the travel direction (the X-axis direction). This configuration enables the wall surface suction-type travel device to smoothly transfer, for example, from a wall surface to a ceiling surface as compared to single pivot axis Sa.

A device such as a camera for photographing a wall surface, for example, may be installed on portion 222a of joint mechanism 222 interposed between two pivot axes Sa1, Sa2 shown in FIG. 7.

Further, in the exemplary embodiment described above, as shown in FIGS. 4A and 4B, elastic mechanism 30 is designed to expand or contract in the extending direction and urge first travel unit 12A and second travel unit 12B through elastic member 38 such as a spring that is deformed by compression.

However, exemplary embodiments of the present disclosure are not limited to this example. For instance, the elastic mechanism may be what is called a leaf spring that is a metallic plate elastically deformable by flection with one end fixed to first travel unit 12A and the other end fixed to second travel unit 12B.

In the exemplary embodiment described above, as shown in FIG. 1, wall surface suction-type travel device 10 has two travel units. However, exemplary embodiments of the present disclosure are not limited to this example. The wall surface suction-type travel device may have three or more travel units. If the suction-type travel device has a plurality of travel units, the travel units adjacent to each other are coupled together through a joint mechanism and an elastic mechanism. For instance, if the suction-type travel device has three travel units, the middle travel unit is coupled to the travel unit on one side in the travel direction through a joint mechanism and an elastic mechanism and is coupled to the travel unit on the other side in the travel direction through another joint mechanism and another elastic mechanism In other words, in a broad sense, a wall surface suction-type travel device according to the present disclosure includes a first travel unit, a second travel unit, a joint mechanism, and an elastic mechanism. The first and the second travel units are aligned along a direction in which the suction-type travel device travels and are each capable of traveling on a wall surface while being suctioned on the wall surface. The joint mechanism couples the first and the second travel units together such that the travel units can pivot relative to each other on a pivot axis extending in a direction that is perpendicular both to a direction in which the suction-type travel device faces the wall surface and the travel direction. The elastic mechanism includes a first end fixed to the first travel unit, a second end fixed to the second travel unit, and an elastic member configured to be elastically deformed when one of the first and the second travel units pivots relative to the other travel unit and a distance between the first end and the second end is shortened.

The exemplary embodiments have been described above as examples of the technique of the present disclosure. For this purpose, the accompanying drawings and the detailed description have been provided. Accordingly, in order to illustrate the above technique, the components described in the accompanying drawings and the detailed description may include not only components that are essential for solving the problem but also components that are not essential for solving the problem. For this reason, it should not be immediately deemed that those unessential components are essential just because those unessential components are described in the accompanying drawings and the detailed description.

Since the above described exemplary embodiments are intended to exemplify the technique according to the present disclosure, various modifications, replacements, additions, and omissions can be made within the scope of the appended claims or of their equivalents.

INDUSTRIAL APPLICABILITY

The present disclosure is applicable to a device that travels on a wall surface while being suctioned on the wall surface.

REFERENCE MARKS IN THE DRAWINGS 10, 110, 210: wall surface suction-type travel device
12A: first travel unit 12B: second travel unit
22, 222: joint mechanism
30: elastic mechanism
32a: one end (first end)
34a: one end (second end)

The invention claimed is:

1. A wall surface suction travel device comprising:
a first travel unit and a second travel unit that are aligned along a travel direction in which the wall surface suction travel device is configured to travel, each of the first travel unit and the second travel unit being configured to travel on a wall surface while being suctioned on the wall surface;
a joint mechanism configured to couple the first travel unit and the second travel unit together so as to enable the first travel unit and the second travel unit to pivot relative to each other on a pivot axis extending in a direction that is perpendicular to both the travel direction and a direction in which the wall surface suction travel device faces the wall surface; and
a plurality of elastic mechanisms, each of the plurality of elastic mechanisms including a first end fixed to a side face of the first travel unit, a second end fixed to a side face of the second travel unit, and an elastic member configured to be elastically deformed when one of the first travel unit and the second travel unit pivots relative to another of the first travel unit and the second travel unit and a distance between the first end and the second end is shortened,
wherein a face of the first travel unit and a face of the second travel unit are coupled to each other by the joint mechanism, the face of the first travel unit being different from the side face of the first travel unit and the face of the second travel unit being different from the side face of the second travel unit, and
wherein the joint mechanism is between the plurality of elastic mechanisms.

2. The wall surface suction travel device according to claim 1, wherein each of the plurality of elastic mechanisms includes a first rod having the first end, a second rod having the second end, and a holder configured to hold the first rod and the second rod such that the first rod and the second rod are slidable on an identical straight line,
wherein, in each of the plurality of elastic mechanisms, the elastic member is between the first rod and the second rod,
wherein, in each of the plurality of elastic mechanisms, the first end is fixed to the first travel unit such that the first rod is allowed to pivot, and wherein, in each of the plurality of elastic mechanisms, the second end is fixed to the second travel unit such that the second rod is allowed to pivot.

3. The wall surface suction travel device according to claim 1, wherein the joint mechanism is a universal joint.

4. The wall surface suction travel device according to claim 1, wherein the first travel unit and the second travel unit have respective crawlers configured to roll on the wall surface.

5. The wall surface suction travel device according to claim 4, wherein the first end and the second end of each of the plurality of elastic mechanisms are fixed to outer sides of the respective crawlers.

6. The wall surface suction travel device according to claim 1, wherein the first travel unit has a suction device to get the first travel unit to be suctioned on the wall surface and the second travel unit has a suction device to get the second travel unit to be suctioned on the wall surface.

7. The wall surface suction travel device according to claim 1, wherein, while a preceding travel unit that is one of the first travel unit and the second travel unit is transferring from the wall surface to another wall surface, the preceding travel unit is configured to travel while being not suctioned owing to suspension of suction and a succeeding travel unit that is another of the first travel unit and the second travel unit is configured to travel while being suctioned.

* * * * *